United States Patent
Mead

(10) Patent No.: US 6,623,323 B1
(45) Date of Patent: Sep. 23, 2003

(54) FLEXIBLE MALE FEMALE MOLD FOR CUSTOM SURFBOARD PRODUCTION

(76) Inventor: Kirby J. Mead, 8335 South Catalina, Whittier, CA (US) 90602

( * ) Notice: Subject to any disclaimer, the term of this patent is extended or adjusted under 35 U.S.C. 154(b) by 0 days.

(21) Appl. No.: 09/743,760

(22) PCT Filed: Jan. 14, 2000

(86) PCT No.: PCT/US01/01208

§ 371 (c)(1),
(2), (4) Date: Jan. 12, 2001

(87) PCT Pub. No.: WO01/51350

PCT Pub. Date: Jul. 19, 2001

Related U.S. Application Data

(60) Provisional application No. 60/176,136, filed on Jan. 14, 2000.

(51) Int. Cl.[7] .................................................. B63B 1/00
(52) U.S. Cl. ........................................ 441/74; 114/357
(58) Field of Search ............................. 114/357; 441/74

(56) References Cited

U.S. PATENT DOCUMENTS

| | | |
|---|---|---|
| 3,514,798 A | 6/1970 | Ellis |
| 3,543,315 A | 12/1970 | Hoffman |
| 3,802,010 A | 4/1974 | Smith |
| 3,929,549 A | 12/1975 | Smith |
| 4,065,337 A | 12/1977 | Alter et al. |
| 4,255,221 A | 3/1981 | Young |
| 4,383,955 A | 5/1983 | Rubio et al. |
| 4,713,032 A | 12/1987 | Frank |
| 4,753,836 A | 6/1988 | Mizell |
| 4,797,312 A | 1/1989 | Sherwood |
| 4,798,549 A * | 1/1989 | Hirsch ..................... 114/39.14 |
| 4,836,963 A | 6/1989 | Gilman, Jr. |
| 4,964,825 A | 10/1990 | Paccoret et al. |
| 5,023,042 A | 6/1991 | Efferding |
| 5,094,607 A * | 3/1992 | Masters ..................... 114/347 |
| 5,266,249 A * | 11/1993 | Grimes et al. .............. 114/357 |
| 5,512,219 A * | 4/1996 | Rowland et al. ......... 249/114.1 |
| 5,807,152 A | 9/1998 | Wojcik |

* cited by examiner

*Primary Examiner*—Stephen Avila
(74) *Attorney, Agent, or Firm*—Michael J. Hughes; IPLO Intellectual Property Law Offices

(57) ABSTRACT

Method of high-strength sandwich skin fabrication uses the thickness of a high-density foam skin core (27) to mask minor imperfections on the surface of the mold (10,20), thereby allowing the mold to be divided into separate integral parts that have the capacity to be moved, then fixed and set, so as to describe different curves or modify dimensions of the board. Mold is reversible; male/female configurations permit fabrication of a wide array of custom designs. Method offers low production costs due to a rapid mold cycle, reduced labor, and efficient use of space, yet produces an exceptionally high strength, light weight board because of the increased shear strength of the monocoque perimeter rail (70), and the optimum fiber/resin ratio in the cored, structural sandwich skin.

10 Claims, 5 Drawing Sheets

FLEXIBLE MALE FEMALE MOLD FOR CUSTOM SURFBOARD PRODUCTION

RELATED APPLICATION

This application claims priority from United States provisional application 60/176,136 filed Jan. 14, 2000.

BACKGROUND OF THE INVENTION

1. Field of the Invention

This invention relates to methods and apparatus used in the design and manufacture of surfboards, sailboards or similar aquatic boards, referred to generically herein as "board" or "boards."

2. Description of the Related Art

Surfboards and sailboards are of similar shape, however the sailboard is generally manufactured in a mold, while the surfboard is fabricated using a labor-intensive moldless or custom method of construction. The conventional molds used in surfboard and sailboard construction comprise top and bottom halves, with a part line at the point of greatest breadth along the board's perimeter edge or rail, and utilize the mold's concave, female surface to define the shape of the board, and impart a smooth surface to the fiber-reinforced plastic skin. Currently available molded production techniques restrict the shape of the board to an exact duplicate; which generally limits molded production to the less demanding design of the sailboard. For molded surfboard production, the very wide variation in size and shape requires the manufacturer to invest in a large and prohibitively expensive inventory of molds, and eliminates the many custom design modifications that are made in the prior art as a matter of routine.

a. Moldless, or Custom Board Production

The surfboard is typically constructed without a mold. The board is individually hand-shaped from a polyurethane foam blank, and the fiberglass and resin are applied by hand over the shaped foam core. The process is labor-intensive, requires considerable skill, and involves structural problems that dictate dividing the production process into two separate steps, with the foam blank supplied by a separate manufacturer.

To enhance the strength of the foam, the blank is molded in an extremely strong, heavy mold made of reinforced concrete. This allows an excess of liquid pre-foam to be poured in the mold; as the foam expands, the excess compresses under high pressure against the surface of the mold and produces a density-gradient in the blank—the foam is soft and weak in the center and becomes progressively harder and denser towards the surface. To avoid removing too much of the harder, denser surface foam during shaping, the blank is molded close-to-shape, or as thin as possible. This close-to-shape molding has the drawback of increasing the requisite number of molds for surfboard production, and frequently leaves insufficient foam in the nose and tail areas of blank for the shaper to produce the desired lengthwise bottom curvature or rocker in the board.

The molded in rocker of the blank must therefore be modified by the blank manufacturer by gluing the blank to a wooden center spar or stringer cut to dimensions specified by the customer, and usually selected from a list of stock lengthwise rocker modifications. Clark Foam of Laguna Niguel, Calif., (www.clarkfoam.com) lists in its Rocker Catalog the dimensions of over two thousand different templates available to modify the lengthwise curvature of the more than sixty blank molds offered for surfboard production. Producing density gradient in the foam and producing the frequent lengthwise rocker modifications are necessary to maintain an adequate level of strength on the board significantly increase the costs of production but are essential, because the board's impact resistance is very low.

The single fiberglass ply used on the bottom of the board will usually dent or fracture with moderate finger/thumbnail pressure, while the double or triple layer used to reinforce the deck (or top surface of the board) in the tail area where the rider stands often fatigues, becomes permeable to water, then fails and completely delaminates under the repeated high pressure of the rider turning the board. Shaping also limits the effectiveness of the longitudinal reinforcement—it makes wood the material of choice for the center spar and also makes it impractical to add top and bottom spar caps—the lack of effective longitudinal reinforcement leaves thinner in particular susceptible to breakage.

The fundamental problem is the one-to-one weight ratio of skin material to interior core. With current methods of production, the only practical method of improving this ratio and enhancing the overall strength-to-weight ratio of the board is to use the second and more expensive of the two basic methods of molded sailboard construction outlined briefly below.

b. Molded Methods of Production

The methods of molding that offer very low overall costs of production typically employ a blow-molded or thermoformed skin of pure plastic, or lightly foamed, fiber-reinforced plastic, and generally produce boards with excessive weight or an inadequate level of strength. An illustration of low production costs, however, is provided by the U.S. Pat No. 4,713,032 to Frank, the specification of which is incorporated herein, which uses quick-setting foamed polyurethane resin in the skin to achieve a rapid mold-cycle of about twenty minutes per board and high production from the molding tool of as many as twenty-four boards per day. The light foaming of the resin matrix greatly reduces the tensile strength of the reinforcing fiber, however, which leaves strength-to-weight and skin-to-interior core ratios well below expensive high performance sailboards that employ a "cored composite" or "structural sandwich" skin.

The core in the structural sandwich—usually a thin layer of high-density plastic foam—spaces apart the two layers of high-strength laminate on either side so that the skin delivers the strength and stiffness of much thicker material, but at a fraction of the weight. The sandwich skin is expensive to fabricate because of the very long mold cycle—vacuum pressure is used to cause the skin material to conform to the shape of the mold, to prevent any spring-back of the skin core the material must remain in the mold under vacuum pressure for about two to three hours, until the resin has completely cured. The added drawback is that the difficulty removing excess resin from the laminate usually prevents the skin structure from attaining even higher strength and a further reduction in weight.

For example, when the laminate is saturated in the shallow, concave interior of the opened mold, the mold's shape is a problem because the sharp edge contours create a dam, and the addition of the sheet foam skin core layer creates a buffer that significantly reduces the effectiveness of the squeegee on the interior layers of laminate. When the skin is fabricated first, the core of the board is formed by injecting liquid polyurethane pre-foam into the interior of the closed mold, the drawback being that this requires an extremely strong mold; the halves are typically attached to steel reinforcing jigs and held in a hydraulic press to prevent the mold from distorting, buckling or separating under the high pressure.

A more common method of sandwich skin fabrication is to use a lighter weight, pre-molded core of EPS (expanded polystyrene bead) foam. In this method the wet epoxy laminate/PVC sheet foam of the sandwich skin fits into molded-in recesses in the EPS core and the entire assembly is placed in the mold, the exterior of which then precludes resin removal by hand. Vacuum is applied to press the components tightly together and squeeze excess resin out in the process, but the pressure is limited to about 12–15 inches of Hg to prevent the mold from distorting and the foam core collapsing. Full vacuum (27 in. Hg) can be applied using the mold disclosed in the U.S. Pat. No. 5,023,042 to Efferding, the specification of which is incorporated herein, which provides an evenly flexing upper mold half that eliminates distortion problems by creating a completely even, permanent compression set of about three sixteenths of an inch in the finished board. This requires an interior core of uniform density, however; internal shear webs, compression inserts in the tail area, or hollow, weight-reducing chambers in the interior are problematic, as they tend to exacerbate distortion problems under vacuum. The additional problem in the above techniques is that the skin core generally will not conform to the sharp, compound curvature at the rail; the loss in strength caused by the gap in the sandwich structure at the perimeter edge is made up by adding many extra layers of laminate or molding-in an inward turning rail flange, both of which add extra labor and unnecessary weight.

c. Processes for forming Thermoplastic Skin

U.S. Pat. No. 4,065,337 to Alter et al., the specification of which is incorporated herein, describes a process for molding structural members from plastic sheets for use in forming boat hulls.

At the time of the present invention, the board making arts had need of a method of high-strength sandwich skin fabrication with a mold-cycle sufficiently reduced to make production costs competitive with the low-cost pure plastic, or lightly foamed, fiber-reinforced plastic skin methods of production outlined above. In this invention, the method of producing such a skin has led to the development of a mold that has the capacity to produce custom or identically shaped boards. Accordingly, the present invention has the potential to eliminate the serious structural shortcomings and productivity constraints found in both the hand techniques and molded methods of the prior art.

SUMMARY OF THE INVENTION

In an embodiment of this invention, the board comprises right and left halves; the structural exterior skin in each half is a thin monocoque shell composed of a layer of high-density plastic foam and layer(s) of fiber reinforced plastic composite laminate. The board's exterior skin encompasses low-density foam, chambered foam, honeycomb foam or a generally hollow interior; the two halves are bonded together at or about the longitudinal axis of symmetry, to a high-strength composite spar in a box- or I-beam configuration.

A mold used to fabricate the above board is divided into right and left halves, and each mold half then comprises two additional components: a substantially flexible female surface imparts a smooth surface to the exterior skin, and a rigid mold component defines the shape of the board by means of vacuum-forming a thin layer of skin core and high-strength facing material to form a complete exterior skin.

When molded, the thin layer of material in the skin core has sufficient thickness to bridge small gaps and mask minor imperfections on the surface of the mold, allowing the shape-defining mold to be divided into separate parts designed to be moved, then fixed and set to change dimensions, describe different curves or modify other parameters of the board's design. In the present invention, for example, the bottom panel of the mold is designed to bend lengthwise to alter the rocker curvature of the board, the deck panel is adjustable to control thickness, a flexible, articulated rail component fits between the two to modify the outline and width, and nose and tail components, designed to slide fore and aft for changes in length, complete either end. Reference for the movement and fixed attachment of the mold parts is provided by a mold base, placed parallel to the mold's longitudinal axis of symmetry, and/or each other.

When fixed attachment is to a mold base, the exterior or male surface of the mold is used, and the mold thus configured and can accommodate virtually all the common modifications required within a particular style of board. The added compound curvature of certain design features, however, can limit the bending capacity of the affected mold panel or rail component sufficiently to make further smooth bending difficult if not impossible. These cases are accommodated by an alternate embodiment of this invention, in which the mold components are reversed and attached to an external frame, thereby creating the concave cavity of a female mold. After the rocker, thickness and various design parameters of the mold are set, foam is molded in the cavity to produce a foam blank that, upon removal, can quickly have the desired features shaped by hand; the shaped blank then provides the (male) mold needed to form the thin layer of core in the structural exterior skin. The male/female configurations of the mold permit the fabrication of a wide array of custom designs, and the board thus produced has a high-strength structural sandwich skin with low costs of production.

In a method of forming the board, skin is formed by placing a sheet of high-density thermoplastic foam between a mold and an airtight bag; after heating the foam to its deformation temperature air is withdrawn from the bag, whereupon vacuum pressure causes the layer of foam to conform to the shape of the mold, creating a thin foam shell that then defines the exterior shape of the board in the subsequent steps of production.

When laminate is applied to the skin core, its pre-molded shape gives sufficient form and stability that it performs the normal function of the mold—it provides an accurate shape in the laminate as it hardens and cures. Because the original shape-defining mold no longer plays a critically important function in this role, the laminating step is designed so that the thin, flexible female component, or another thin layer of material, eliminates the bond between the wet laminate and the surface of the mold, while a third member is attached or temporarily combined with the skin core so the laminate/skin core assembly can be removed from the mold and set aside to cure, thus reducing the mold-cycle to the time needed to initially pre-mold the skin core and apply the laminate, under ten minutes per side in each operation. The technique is adaptable to the conventional female mold of the prior art, though the broad, flat pre-molded skin cores in top and bottom halves will readily bend of their own weight, making the additional support provided by an EPS core or longitudinal spar desirable throughout the cure. The skin core is pre-molded into a thin shell that forms an arch lengthwise and in cross-section—the stability provided by its arcuate shape provides significant manufacturing benefits and produces an exceptionally strong, lightweight board as well.

The board is laminated with the width at right angles to the worktable, where gravity provides a very effective aid in removing excess resin. The thin, flexible female surface allows substantial squeegee pressure to pass through to the laminate, gravity then removes the rest—unobstructed, the resin quickly runs off the smooth, vertical sides of the molded foam shell, leaving an absolute minimum within the fiber. The higher strength of the laminate—combined with the greater shear strength of the seamless monocoque rail— allows a further reduction in the weight of the interior core. In addition, the bond-line and its attendant reinforcement are moved away from the perimeter edge and placed along the longitudinal centerline of the board, and used to create a high strength composite spar that guards against board breakage. Other advantages include a more efficient use of space—the board's thickness rather than its width occupies manufacturing area during construction—and the major labor savings possible using a mechanical fabric-impregnator to quickly pre-saturate the fiberglass cloth. These, and other structural advantages and manufacturing benefits will be more fully explained and better understood given the context provided by the detailed description of the invention, and upon viewing the drawings.

DETAILED DESCRIPTION OF THE INVENTION

Figure 1:
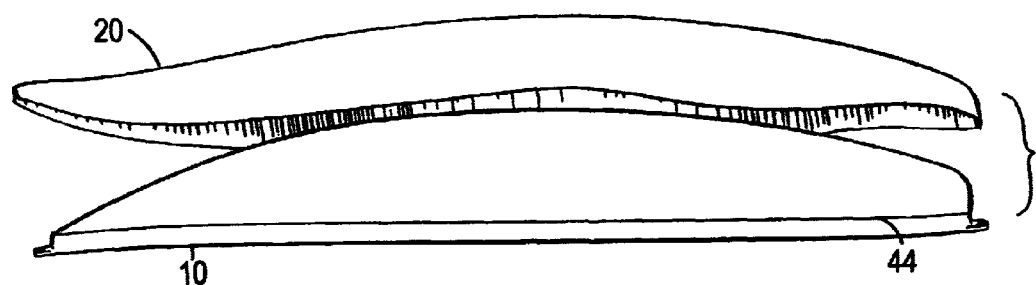
FIG. 1 is a side view of the two basic components that comprise one right-hand mold half according to the present invention.

The following description of the invention provides an illustration of method and apparatus that will impart an understanding of the invention to a person of skill in the art. However, as will be apparent to those of skill in the art, modifications to the embodiments may be made without departing from the spirit and scope of the invention. Therefore, the following description is provided for purposes of illustration and should in no way be interpreted to limit the invention, which is defined more fully and accurately in the appended claims.

For ease of illustration and to avoid obscuring the invention, the following discussion is divided into four parts that detail the construction of the mold, an outline of the design, and the methods used to mold the material to create the completed board. For purposes of clarity, the drawings typically illustrate only one half of the symmetrical board/mold; the deck or top surface is facing the viewer and the nose is oriented to the left. The reference numeral 10 denotes either right or left half of the shape-defining mold component, in male or female configuration, or a configuration that accommodates both male and female configurations (i.e., where the shape defining component has an inherently functional interior surface which forms a female component and an inherently functional exterior surface that forms a male component).

1. Construction of the Mold

The novel mold of the present invention may be divided into two basic parts consisting of a substantially rigid member that defines the overall shape of the board, and a substantially flexible female surface that is used primarily to impart a smooth surface in the exterior skin. The rigid shape-defining component, which may be of unibody construction, or comprise one or more surfaces, sub-parts or a plurality of pieces, is preferably constructed with fiber-reinforced, high-heat compatible tooling epoxy composite or similar material as appropriate. In addition, the mold surfaces or subparts may incorporate a rubber, such as silicone, to create fairings that provide a tapered surface between the moveable, individual shape-defining mold surfaces, or to create a smooth surface for the articulated skeletal structure of segmented pieces, such as for example, the perimeter of the mold, which will be described in greater detail below.

The substantially flexible female surface is used primarily to impart a smooth surface in the exterior skin. Because it usually plays a limited role in defining the board's shape, a thin, inexpensive layer of material generally suffices. This allows the female mold 20 it to be constructed from a layer of thermoplastic material, such as a thin sheet of ABS (acrylonitrile-butadiene-styrene), PC (polycarbonate), etc. molded and, when appropriate, subsequently trimmed in the same manner as the thermoplastic skin core of the board described in greater detail below. When the female component must conform to a variety of shapes, as in the production of custom boards, it may be constructed with a thin layer of plastic composite generally corresponding to the broad, planar top and bottom surfaces of the board, and incorporate a rubber such as silicone to conform to the male radius at the board's perimeter edge. The silicone can also have fiberglass added to create a silicone/fiberglass composite.

2. Mold Configurations for Custom and Identically Shaped Boards

In this invention, the specific design and construction of the mold depends on whether it is intended to produce custom or identically shaped boards.

Turning now to FIG. 1, when the identical reproduction of a specific board shape is a primary consideration, the mold may be constructed as shown in FIG. 1, which gives a side view of the two basic components of one right-hand mold half. As depicted, the shape-defining component 10 has a single continuous surface or unibody construction. As illustrated, the width of the shape-defining mold component 10 is oriented vertically and the substantially flexible female component 20 is shown being fitted over the shape-defining mold 10; the scribed line 44 represents the hypothetical centerline of the molded skin core 27 (not shown in this view) of a right hand board half.

Figure 2A:
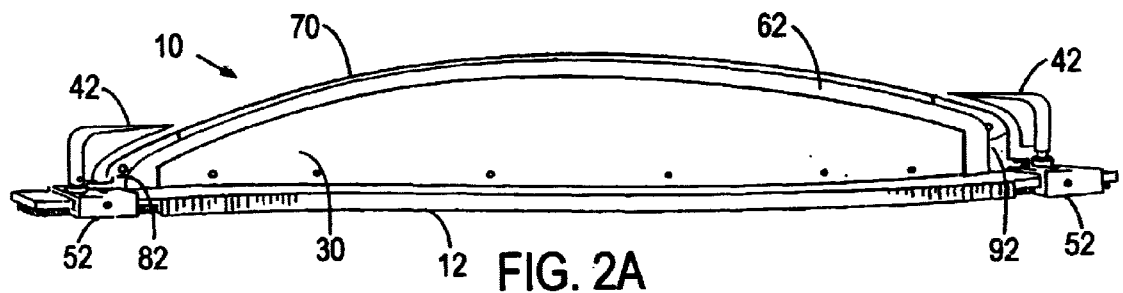
FIG. 2A is a side view of a right-hand mold according to a second embodiment wherein the shape-defining right-hand mold comprises separate integral parts; the individual parts are shown assembled to a mold base to create a complete male mold.
Figure 2B:
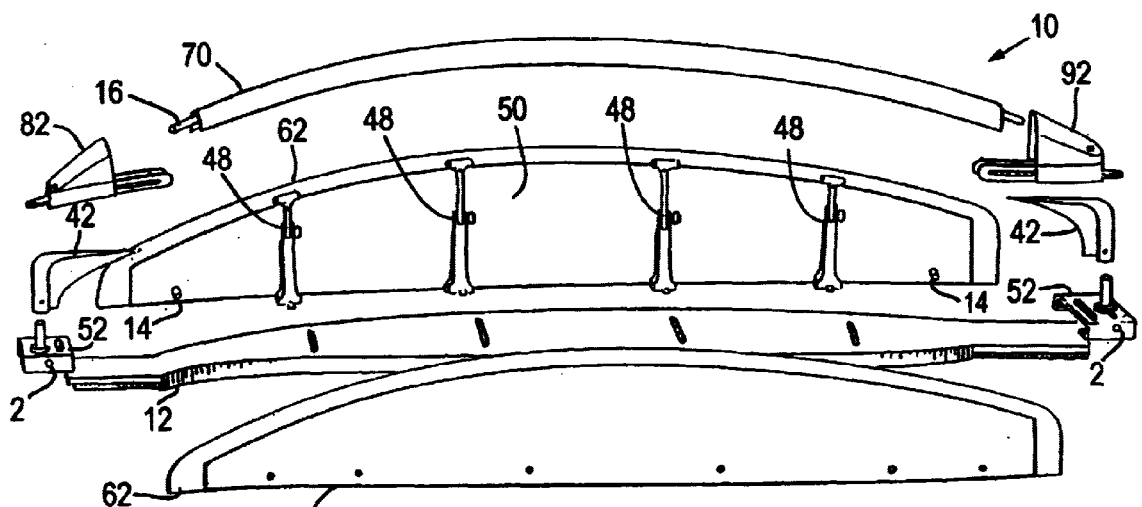
FIG. 2B is an exploded view of the right-hand mold of FIG.2A.

Turning now to FIGS. 2A and 2B, when custom shaped boards are manufactured, the mold may be divided into separate surfaces, parts and/or sub-parts, with each sub-part generally corresponding to a specific aspect of the board's design. The individual sub-parts may be designed to be moved, then fixed and set, so as to alter a specific curve, dimension or parameter of the board's design. In FIG. 2A, the sub-parts are shown assembled in a male configuration, to illustrate that when fully assembled the sub-parts form an integral or substantially integral shape-defining mold 10 attached to a mold base 12 that parallels the mold's longitudinal axis of symmetry.

FIG. 2B is an exploded view of the mold of FIG. 2A, which is intended to provide a general illustration of the various individual sub-parts that may together comprise a completely assembled right-hand mold half 10 assembled on a mold base 12 in a male configuration.

A perimeter rail part 70 is depicted directly above the bottom rocker panel 50, which is shown at right angles to a mold base 12 that, in this example, provides an external reference and surface to which the bottom rocker panel 50, and/or the other sub-parts may be attached. Opposite the rocker panel 50 is the deck panel 30. When the mold sub-parts of the shape-defining mold 10 are used in conjunction with a mold base 12, the exterior or male surface of the shape defining sub-parts is used and both panels (30, 50) may have a complement of transverse (wherein transverse is normal to the longitudinal axis of symmetry of the mold) stiffeners 48 on the respective interior sides, visible this view only on the rocker panel 50.

As will be appreciated by a person of skill in the art, the base of the transverse stiffeners 48 may be provided with an adjustment mechanism that controls the distance of the deck 30 and rocker 50 panels from each other, thereby allowing the thickness of the eventual board to be modified. In this example, the upper part of the transverse stiffeners 48 have sliding rods 24 that attach directly to the fiberglass rod 16 on the inside of the perimeter rail 70, the movement of which controls the board's outline and width. For example, the structural skeleton of the perimeter rail 70 may comprise an articulated rib/backbone arrangement made of molded tooling epoxy composite and rubber, with a molded fiberglass or carbon-fiber rod 16 functioning as the backbone and closely spaced ribs of plastic composite imbedded in molded rubber (not shown). The form providing skeletal structure or another similar design then allows the perimeter rail 70 to flex lengthwise with different rocker curvatures of the rocker panel 50, expand and contract to incorporate the varied thickness of the deck panel 30, and adjusted to different widths and describe different outline curvatures as well. Those of skill of art will be appreciate that other materials and/or skeletal structures may be employed to achieve the same effect without departing from the scope of the invention.

Molded nose 82 and tail blocks 92 may be designed so that they slide fore and aft on, for example, a protruding bolt 14, and the position then secured by tightening a knurled nut (not shown) for changes in length; the exterior edge or rail area of each component (82, 92), as depicted, is designed to rotate on a hinged pin or a similar device (not shown) so as to accommodate changing outline shape of the perimeter rail 70 as it does so. The lengthwise rocker curve provided by the nose 82 and tail 92 components of the shape-defining mold 10 may be adjusted by attachment of the nose 82 and tail 92 components (i.e., the continued curvature of the rocker panel 50) to the moveable rocker plates 52 provided at either end of the mold base 12. The rocker plates 52 may be designed to provide movement in two different directions with a moveable threaded nut (not shown) captured in an internal channel or slideway (not shown), which allows the desired rocker of the nose 82 and tail 92 components to be set by tightening a screw (not shown) for example. In addition, the rocker plates 52 may be designed so that they slide fore and aft on the mold base 12 and set to the desired position by tightening an Allen screw 2 or other suitable positioning mechanism. The edges of the various sub parts may be very finely tapered to reduce the ridge or gap between the separate individual surfaces so as to minimize any transfer or print-through of minor mold imperfections to the surface of the board in the molding process. This may be accomplished all or in part with an optional flexible rubber fairing 62, which is depicted in this example running the length of both panels 30 and 50, but can be utilized between any two moveable sub parts of a shape defining mold 10 constructed according to the general principles of the present invention.

Together, the unibody shape defining mold 10, and the shape-defining mold 10 comprised of individual subparts, may accommodate nearly all the common modifications required within a particular style of board. Certain design modifications, however, such as bottom channels, nose concaves etc., may introduce sufficient compound curvature into the affected sub-part to reduce its bending capacity, and thus limit its future use. The above design features may therefore be more economically accommodated by creating a one-off mold out of plastic foam, which can be used again, or become part of the finished board. This may be accomplished using the concave surface of the substantially flexible female mold 20, or the unibody shape-defining mold 10, the two molds 10 and 20 may be used in conjunction with each other and/or separately. The subparts of the shape-defining mold 10 may also be designed to be reversed, and the resulting concave interior surface used with a separate female surface designed to conform to the interior and/or independently.

Figure 3:
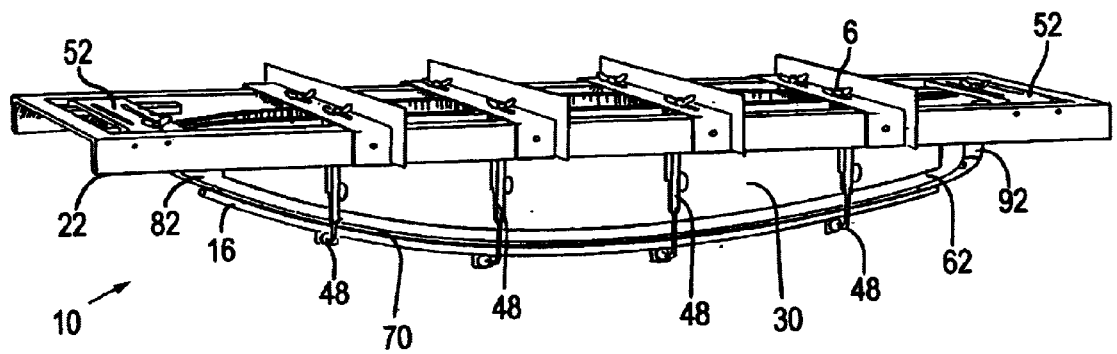
FIG. 3 is a side view, partially in perspective, of a shape-defining left-hand mold half attached an external frame creating a female mold according to another embodiment of the invention.

In the example depicted in FIG. 3, the subparts of the shape-defining mold 10 are shown attached to an external frame 22 to create the female configured shape-defining mold 10 having a modifiable internal cavity. In the present example this is accomplished by reversing the position of the transverse stiffeners 48 and providing attachment to the exterior of the deck 30 and rocker panel 50. The base of the transverse stiffeners 48 are rotated and attachment is to the underside of the frame 22, the transverse stiffeners also attach to the to the externally positioned fiberglass rod 16 on the exterior of the perimeter rail 70.

Figures 5, 6A, 6B:
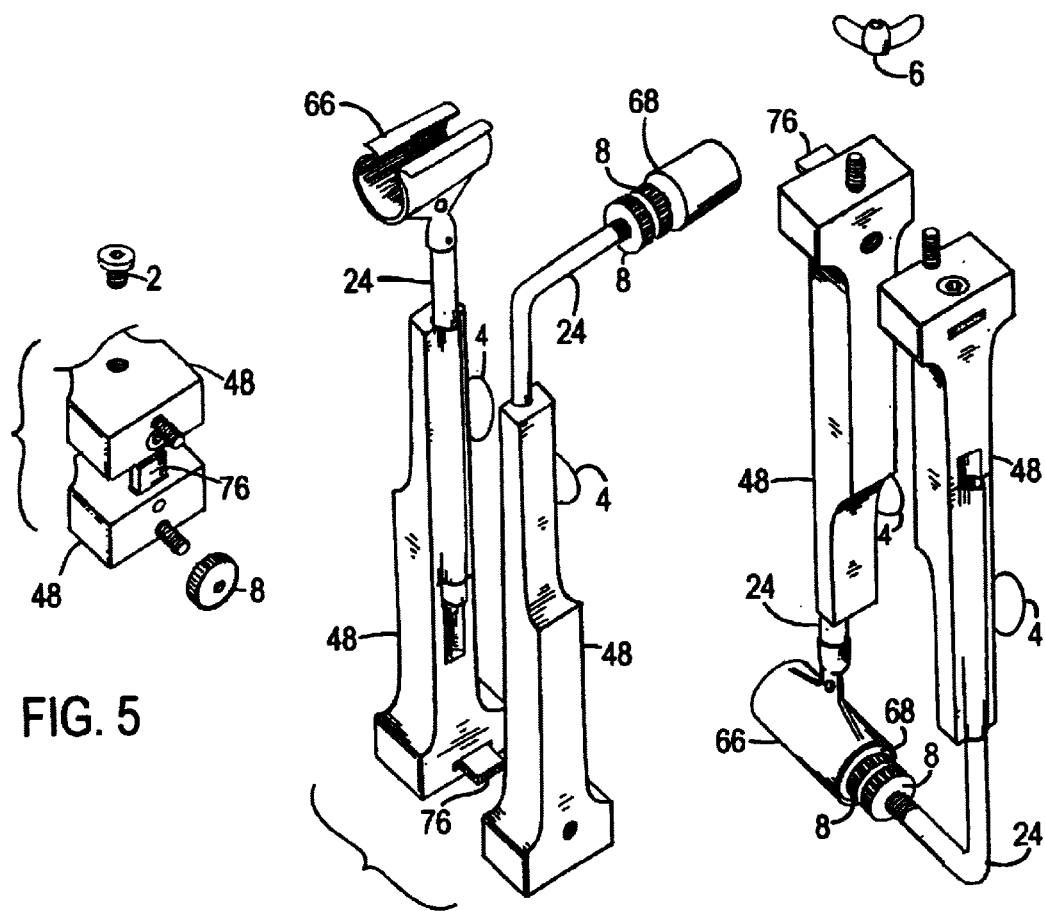
FIG. 5 is a partial view of the base area of two transverse stiffeners.
FIG. 6A is a perspective view of two transverse stiffeners in an upright position, its usual attitude in the interior of a male configured mold.
FIG. 6B is a perspective view of two transverse stiffeners in the reversed position used to create a female mold.

A more detailed example of the role the transverse stiffeners 48 play in modifying the shape of the sub parts comprising the shape-defining mold 10 and allowing the sub parts to be reversed from male to female configuration is provided by a description of the views depicted in FIGS. 5, 6A, and 6B. FIG. 5 is a partial view showing the base area of a transverse stiffener 48 and depicts an Allen screw 2 that may be utilized to hold the deck and rocker panels, and the knurled nut 8 that attaches the respective transverse stiffeners to the mold base 10. As will be appreciated by those of skill in the art, while the transverse stiffeners 48 of FIG. 5 may be constructed using an Allen screw 2 and a knurled nut 8, as depicted, other fastening devices could be employed without departing from the scope of the invention.

FIG. 6A shows the transverse stiffeners 48 in an upright position, corresponding to the interior position when transversely oriented to the width of a male configured shape-defining mold 10 of FIG. 2A, and shows attach points 66 designed to hold the fiberglass rod 16 on the interior of the rail 70. The adjustable rod 24 may be moved and its position set by tightening the wing screw 4; and the movement of the rod 24 then determines the position of the perimeter rail 70 so as to accurately modify the outline and width of the board. As will be appreciated by those of skill in the art, the wing screw 4 may be replaced by any suitable tightener; and the position of the rod 24 may also be secured by any number of fastening mechanisms. FIG. 6B depicts the transverse stiffeners 48 in a reversed position—the base area is facing up for attachment to an external frame 22. The orientation depicted in FIG. 6B is suitable for use in creating the concave cavity of a female mold (such as that shown in FIG. 3). The female configuration in the example depicted in FIG. 3 is created by attaching the transverse stiffeners 48 to the exterior of the deck and rocker panels (30, 50); the adjustable bars 24 are then rotated so the rubber bushing 68 fits into the attach point 66 and the two knurled nuts 8 are then tightened to the attach points on the fiberglass rod 16 on the exterior of the rail 70 as depicted in FIG. 3.

Figure 4:
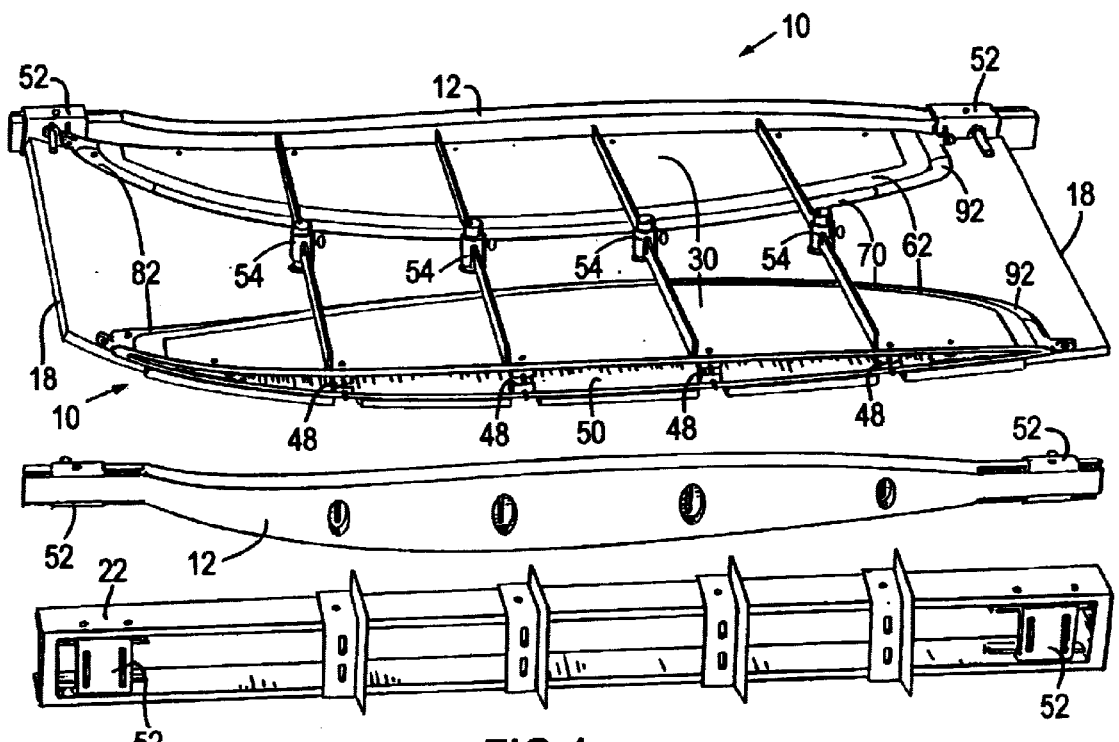
FIG. 4 is a perspective view of the jig-fixture or "rocker table" on which the mold components are assembled to ensure accurate alignment and fit between right-and left-hand sides.

To ensure accurate alignment and match between the right- and left-hand sides, the sub-parts of the shape-defining mold 10, depicted in male and female configurations in FIGS. 2A, 2B and 3, may be assembled on a jig fixture or table 18, providing a function similar to the example shown in FIG. 4.

Before assembly of the flexible mold 10 begins, the "rocker" or lengthwise curve of the table is set by adjusting the position of the series of spring loaded bars (not shown) that support the plane of the table 18 and control the curve along its length, and tightening a worm gear mechanism (not shown) so the plane of the table 18 has the desired lengthwise curvature.

Once the longitudinal curvature or "rocker" of the table 18 has been set to the desired configuration, the individual components of the flexible mold halves 10 may be assembled. As depicted, the respective centerlines of the two halves are parallel to the table's 18 perimeter. Assembly of the sub-pats of the shape-defining mold 10 begins by clamping the rocker panel 50 to the table 18 by means of an extension (not shown) on the adjustable hinged T-squares 54 in the center of the table 18. The rocker of the shape-defining mold 10 is then set for the molding process by attaching the mold base 12 to the rocker panel 50. The width and outline curve of the rail part 70 is modified by adjusting the length of the adjustable rods 24 in the transverse stiffeners 48 to which it attaches (hidden in this view under the deck panels 30). The nose 82 and tail 92 components are then positioned and set to the length desired in the board; the thickness is adjusted by a mechanism in the base of the transverse stiffeners 48 to which the deck panel 30 attaches; the upper transverse stiffeners of the deck panel 30 are then tightened to the mold base 12, and the mold assembly is complete. In the upper portion of FIG. 5, one mold half 10 is shown assembled to the mold base 12, and ready to be removed to be used in the molding of the thermoplastic skin core.

3. Use of the Molds to Produce Boards

In the present invention, the exterior skin of the board comprises a layer of core material, of the type generally used as a core material in a structural sandwich. The skin core of the board is molded in a thermoforming process and in so doing a stable arcuate shell is created. The stability of the molded skin core is provided by the monocoque rail that connects the broad, generally planar top and bottom stability of the shell. The skin core also provides sufficient thickness to mask minor imperfections on the mold's surface, and allows a number of novel methods to be used that makes it possible for the production from the molds in the present invention to equal the flexibility of design found in hand shaped, custom production.

a. Use of a Substantially Unibody Shape-Defining Mold

As will be appreciated by those of skill in the art, the shape defining unibody mold 10 may be constructed with functional convex male exterior and concave female surfaces giving the novel mold of this invention a distinct advantage over the conventional female mold of the prior art. This is particularly true in surfboard production, because many board styles, e.g., modern longboards, even at a specific length (such as 9'), require considerable variations in volume to accommodate a wide range of flotation needs. With interior and exterior surfaces of the shape-defining mold 10 functional, simply using the concave female surface of the shape-defining component 10 rather than the convex exterior as the molding surface can alter the thickness of the board. Thus, one shape-defining mold 10 can easily produce two board thicknesses depending on whether the interior or exterior surface of the shape-defining component 10 is used as the shape-defining surface. In addition, the width of the board can be altered according to where the longitudinal centerline 44 cut is made, the tail can be made wider relative to the nose and vice versa, so that boards made from a mold for a single popular shape can be tailored to accommodate a wide range of individual flotation and performance needs.

The flexible female mold 20 plays an important role in the above process. If made of thermoplastic material as described above, the flexible female mold 20 may be specifically molded, or molded and trimmed, to fit in the interior of the shape-defining mold 10 and break the bond between the wet resin on the surface of the laminated skin core 27 and the interior surface of the shape-defining mold 10, thus reducing the mold-cycle by making it possible for the laminated skin core 27 to be removed from the mold almost immediately after the resin gels and has taken an initial set, which may be roughly half an hour using the aforementioned example.

b. Use of the Sub-Parts in a Reversible Male/Female Configurations

As discussed previously, the movement and fixed positions of the sub-parts of the shape-defining mold 10 in a male configuration (shown in FIGS. 2A and 2B) will produce all the design modifications in terms of bottom rocker, outline curvatures, thickness dimensions and length adjustments typically required within a particular style of board. Certain design modifications, however, such as bottom channels, nose concaves etc., introduce enough compound curvature into the affected sub-part to greatly reduce its bending capacity, thus limiting its future use. The above design features are therefore more economically accommodated by creating a one-off mold out of plastic foam 40 that duplicates the function of the shape defining male mold 10 described above; the foam mold 40 may be used once and become part of the finished board, or be used to form more than one board.

To create the foam mold 40, the sub parts of the shape-defining mold 10 in a male configuration (FIGS. 2A and 2B) are reversed to allow the concave female surfaces to be used. As discussed previously, this may be accomplished by reversing the position of the transverse stiffeners 48 so that the shape defining mold components 10 may be attached to an external frame 22, thereby creating the concave cavity of a female mold 10 (see, e.g., FIG. 3). The concave cavity of the female shape-defining mold 10 is then used to mold foam, for example a two part polyurethane foam, the formulations and molding of which are widely known in the prior art, in order to produce a foam blank that makes it possible for the desired design modifications to be shaped into the foam by hand; the foam blank is then used as a the male mold or form to mold the thin layer of skin core material that defines the exterior shape of the board, in the same manner as the male configured shape defining mold 10 of the present invention.

As will be apparent to those of skill in the art, the shapes that can be produced by the novel mold configurations in the present invention fully equal the flexibility of design in the expensive hand techniques of custom board fabrication.

4. Method of Use of the Molds to Producing Boards

The method of this invention employs the thermoforming or molding of two chemically similar but physically different materials i.e., sheets of pure plastic and plastic foam. The thermoforming of sheets of plastic having an acrylic, polycarbonate etc. base is widely known and used successfully in many applications. As is known by those of skill in the art, the heat and pressure necessary in the thermoforming process can be applied in a variety of ways; commonly an oven (not shown) or other well-insulated chamber is used, with vacuum supplying all or a significant portion of the pressure needed. A description of a suitable oven is not presented to avoid obscuring the invention. However, the oven requirements would be ascertainable by persons of skill in the art.

Plastic foam however, because of its physical characteristics, generally exhibits a very limited capacity to stretch and particularly to compress when pressure is applied to cause it to conform to a specific curvature in the thermoforming process. The foam will conform to gradual curvature, and will readily conform to the shape of the board divided into top and bottom halves. In right and left halves, however, the board's outline is as much as ten percent longer than the measurement lengthwise at the center, and compound curvature is present along the perimeter rail, which becomes severe at the nose and tail of the board. Because of this, the foam tends to fold in large uncontrollable folds and wrinkles instead of conforming to the exaggerated curvature that is usually present at either end.

Figure 7:
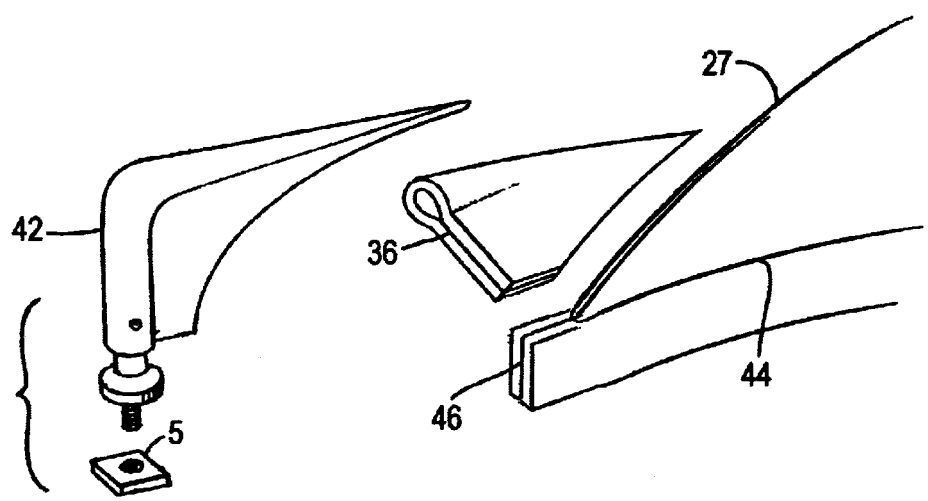
FIG. 7 is a perspective view of the mold extension and a partial view of the nose area after thermoforming the high-density foam skin core.

Referring to FIG. 2, the general principle used in the present invention to prevent these wrinkles is by providing a simple mold extension 42 to the nose and tail areas that makes the outline and centerline measurements more equal. In the example shown, the mold extension 42 is attached to the rocker plate 52 on the mold base 12 at either end of the shape-defining mold 10. FIG. 7 provides a closer view of the mold extension 42 and shows the threaded nut 5, normally captured in the internal channel in the rocker plate 52 (not shown), and provides a more detailed, partial view of the molded skin core 27 removed from the shape-defining mold 10 after forming, depicting its shape after the molding process and showing how the foam the foam folds smoothly over the upper portion of the extension 42, makes the sharp bend at the mold's perimeter rail 70, then smoothly conforms to the top 30 and bottom 50 of the mold (the view depicts the molded skin core removed from these surfaces). The molded skin core 27 ends slightly beyond the eventual centerline 44 of the board.

After forming, the folded foam area 36 is removed with a razor, the foam 27 is then lightly sanded to fair in the surface; in the present example a small tab 46 is depicted, the tab 46 is intentionally created during the trimming of the molded skin core 27 to provide an area that can be clamped to ensure the two sides of the molded skin core 27 are bonded together again during lamination. As those within the skill in the art will appreciate, the above principles may be employed generally in other areas of the molding process to the shape defining molds 10 and to the substantially flexible female mold 20.

The laminate is preferably applied with the width of the mold/foam shell at right angles normal to the worktable. This allows gravity to provide an effective aid in removing excess resin from the laminate, but makes the initial saturation of the fabric difficult because the resin tends to run off more quickly than the cloth can be saturated.

Figure 8:
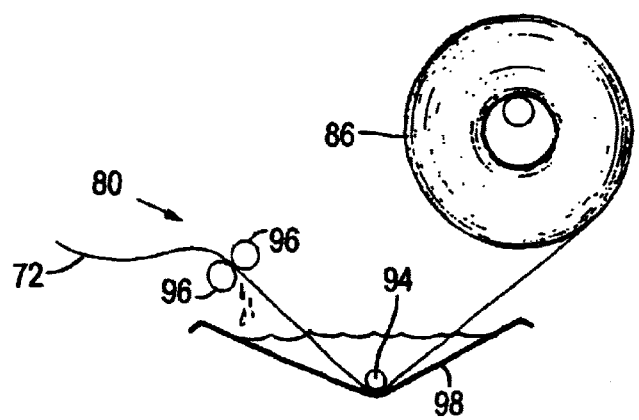
FIG. 8 is a schematic profile view of a mechanical fabric-impregnator that aids in the application of the laminate in this invention.

This drawback can be turned to advantage because the present invention makes it possible to use a mechanical fabric impregnator 80 to quickly pre-saturate the fiberglass cloth. An example of a schematic profile view of the fabric impregnator 80 is shown in FIG. 8 to illustrate the general principles of its use. The bolt of fabric 86 is depicted above the resin bath 98; the cloth 72 is unrolled directly from the bolt 86, immediately saturated as it is submerged and drawn around a roller 94 in the resin bath 98, it then runs between two nip rollers 96 so that the excess resin is removed and the correct amount is left within the fiber.

Figure 9:
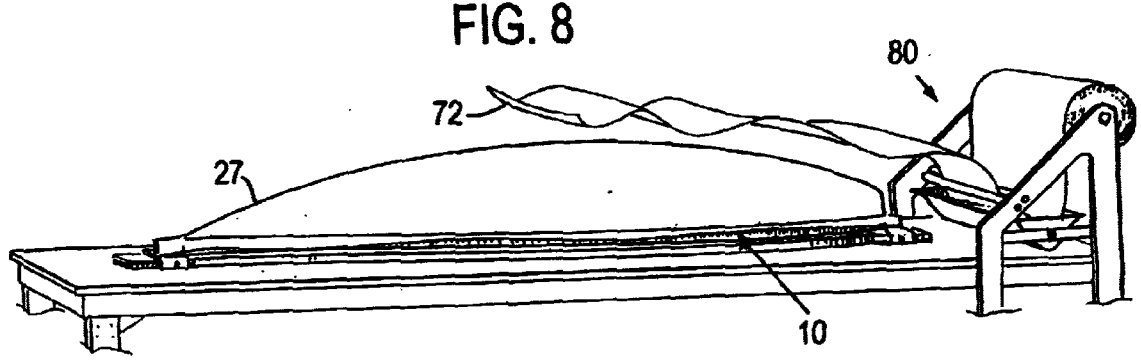
FIG. 9 is a view of a molded skin core being laminated.

FIG. 9 is a perspective view of the cloth 72 being run through the fabric impregnator 80 and up into place to be trimmed on the surface of the mold 10 and premolded skin core 27. To be used effectively, it is preferable that the items being laminated by the impregnator 80 are lightweight and moveable, so that the cloth can be run almost continuously through the fabric impregnator 80 and a series of articles laminated in rapid succession while the resin remains liquid in the bath. As cleaning the fabric impregnator 80 after each use obviates its labor saving advantage, the gel time of the resin may be extended, preferably to about an hour, to prevent premature hardening. In the present invention, the penalty of the much longer cure/mold-cycle and the major loss of productivity that normally ensues is largely removed because the manufacturing area requirements during cure are minimal—the board's thickness, rather than its width consumes space during hardening—and the cure time of the multiple boards that can be laminated in a single run will be an average of the total time the resin takes to gel, or roughly half an hour using the aforementioned example.

The very complete mechanical saturation also allows use of the difficult to saturate, tightly woven, high-strength crowfoot or satin weaves. The loosely woven boat or tooling fabrics that are the norm in the hand saturation methods of the prior art have an open weave that allows rapid resin penetration and wet-out, but require resin contents of about fifty percent by weight due to the large amount of empty space in the fiber. By contrast, the very dense weave of high-strength fabrics reduce resin requirements to only thirty-five percent by weight for complete saturation. Examples include the weave #7781, an eight-harness satin weave weighing 8.71 oz. per square yard, and the #120 crowfoot weave weighing 3.70 oz./yd (the weave numbers are shared by the various manufacturers of fiberglass reinforcing fabrics, for example, by Burlington). Fabric impregnators are commercially available from Gougeon Bros. in Bay City, Mich.

Those with skill in the art will have little problem using the fabric impregnator 80, or following the general procedure for fabricating the structural sandwich skin. Prior to applying the laminate, a first layer of vacuum-bagging material (preferably thermoplastic and formed in the initial molding of the skin core 27) is placed over the exterior of the shape defining mold 10, followed by the first layer of laminate, followed by the pre-molded skin core 27, the additional layer(s) of laminate that form the exterior of the sandwich skin, the female mold component 20; the addition of the exterior of the vacuum bag then completes the assembly. The bag is sealed and the air is withdrawn; the laminated skin core/female mold 27, 20 can be removed from the shape-defining mold 10. Because of the stability provided by its arcuate shape, the laminated skin core/female mold 27, 20 requires only minimal support as it cures, with the interior rail resting on vertical dowels or a similar arrangement as the resin hardens and cures. The opening running its central length may also be lightly clamped to foam of the appropriate thickness that is later removed or becomes part of the finished structure.

After the resin gels and has taken an initial set, the laminated skin core 27 may be razor trimmed and the excess foam/laminate material removed along the longitudinal centerline 44 of the board. The razor will leave a sharp straight edge suitable for subsequent joining; and with practice is easily accomplished by hand, though a strip of aluminum or similar material (not shown) can be pinned to the foam/laminate material 27 to serve as a straightedge and guide.

Figure 10:
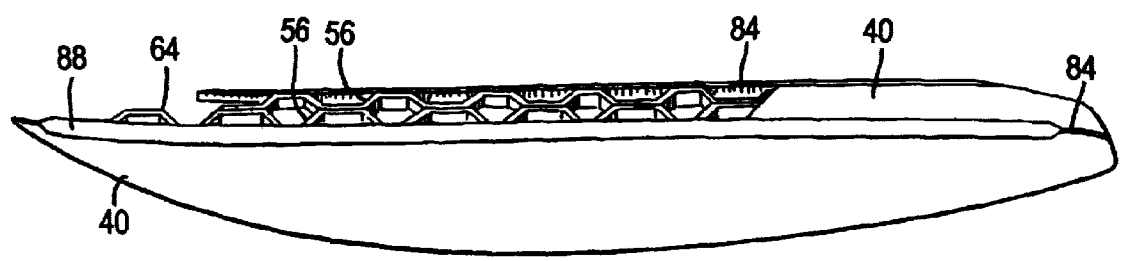
FIG. 10 is a perspective view of various interior cores of the board.

The interior core is then introduced into the hollow, laminated shell 27. FIG. 10 gives a view of an interior material including the hollow rail area 74, longitudinal shear webs 84, a spar cap 88; the view also depicts strips of foam in half-hexagonal configuration 56 joined together to form a foam-honeycomb core 64. The solid foam interior core 40 depicted in the tail area and occupying the entire opposite side 40 can be expanded bead foam, either pre-molded or created by coating pre-expanded beads of foam with a suitable binder and then deposited into the interior of the laminated skin core 27; and partially compressed during cure of the binder by the insertion of a third member—either specially designed for the purpose—or by use of an interior member such as a shear web 84 that becomes part of the finished structure. The solid foam areas 40 can also be polyurethane foam molded according to the method of this invention; in which case it will fit perfectly as it was the form used to define the exterior shape of the skin core 27.

The density of the heavier polyurethane foam, when it comprises the solid foam core 40, can approximate the lighter bead foam cores by removing foam by means of die cutting, punch press, etc. to create a partially hollow, chambered core (not shown), while the cellular walls of the honeycomb foam 64 are created from sheets of foam heated to forming temperature and then thermoformed into the initial half-hexagonal or other acceptable half-cellular configuration. The interior core can also include transverse foam bulkheads 34 facing the perimeter rail—the transverse bulkheads 34 can be made adjustable by attaching foam base areas or channels in which they sit; glue is applied to both surfaces and the interior of the board and while the glue is still wet, the pieces can be moved up or down or otherwise moved to affect a perfect fit and bond in the interior (not shown). The same principle can be used with the shear webs 84, or to other reinforcement, such as sandwich compression inserts (not shown), etc. which can be added in selected areas such as in the tail under the rider's feet to absorb high compression loads. Those within the skill in the art will appreciate that the laminate can be applied where needed to create a sandwich structure as well.

Figure 11:
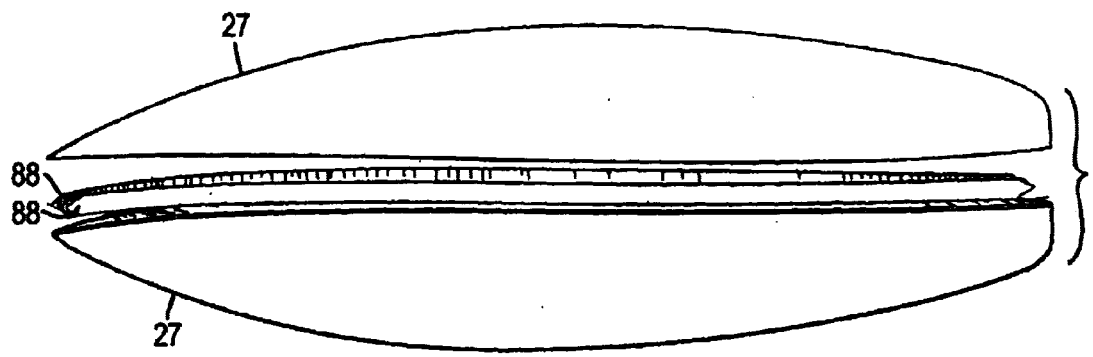
FIG. 11 is a perspective view of two halves of the board being bonded together.

Those with skill in the art will have no trouble attaching side fins, boxes for same, plugs for foot-straps, leashes etc. appropriate for the end use of the board. These devices can be applied in the conventional manner, or access can be from the interior prior to the introduction of the interior core so as to add a backup structure concurrent with the bonding. The center fin, fin box, and/or mast track may be added before; during, or after the two halves of the board 18 are bonded together. In FIG. 11, the two halves 27 of the board are shown before being joined, during which time a longitudinal spar may be created using strips of pre-cured plastic composite material 88 and the bonding resin.

Figure 12:
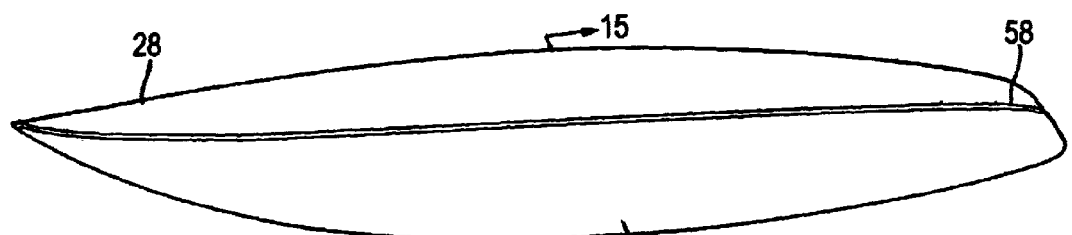
FIG. 12 is a perspective view of a completed board.
Figure 13:
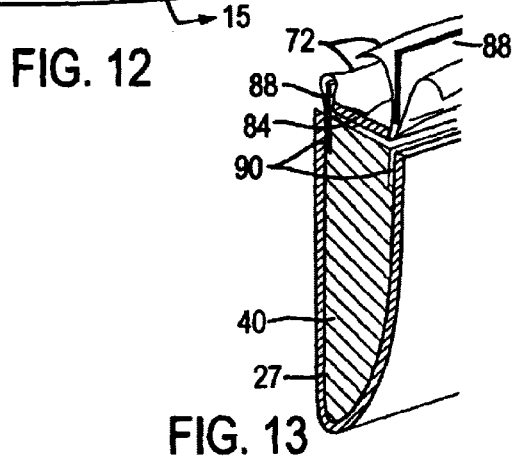
FIG. 13 is a perspective view of a cross-section of a board bonded to a longitudinal spar in an I-beam configuration.

FIG. 13 gives an example of one procedure that can be used to create a high-strength composite spar as the two halves of the laminated skin core 27 of the board are bonded together. A knife or other appropriate tool (not shown) is inserted between the molded sandwich skin core 27 and the foam interior core 40; the thickness of the tool removes sufficient foam to create a slot 90 for the top and bottom spar caps 88. The spar caps 88 are pre-cured strips of plastic composite material, with high-strength uni-directional fiber of S-glass, Kevlar®, carbon fiber etc. running lengthwise, in a high-strength elevated temperature curing epoxy. Extremely high strength, pre-cured unidirectional composite material is also available from Gordon Plastics, in San Marcos, Calif., and Neptco in Pawtucket R.I.; both companies use special dies to ensure absolute fiber straightness, which ensures strength levels well above conventional fabrication techniques. The top and bottom spar caps 88 are wrapped with fiberglass 72 saturated with the bonding resin and tucked into the top and bottom slots 90, the excess fiberglass 72 that comes out of each slot 90 is to form the walls of the shear web 84, which has a sandwich core layer of high-density foam razor-trimmed to shape, and the two halves are then bonded together to form the completed board 18 as shown in FIG. 12.

Figure 14A:
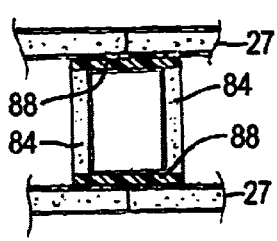
FIG. 14A is a cross-sectional view of a box-beam spar
Figure 14B:
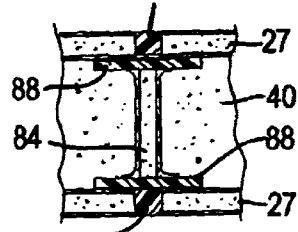
FIG. 14B is a cross-sectional view of an I-beam spar

FIGS. 14A and 14B are elevational views of a cross-section of a board bonded to a longitudinal spar according to the invention. As shown in FIG. 14A the spar caps 88 and shear webs 84 are in a box-beam configuration, while FIG. 14B depicts the shear web 84 and spar cap 88 forming an I-beam, with the gap 58 created by the thickness of the shear web 84 in the bonding operation filled with high-strength fiber such as Kevlar, carbon-fiber of similar material.

Figure 15:
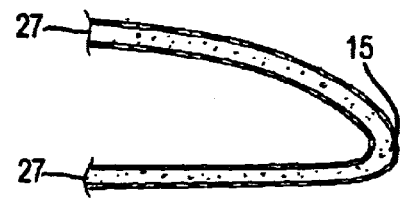
FIG. 15 is a partial cross-sectional view of a monocoque rail of the present invention taken along the lines 15—15 of FIG. 12.

FIG. 15 is a cross-section view of the monocoque rail taken along lines 15—15 in FIG. 12.

It should be noted that the high-strength that can be developed in the spar allows it to carry all the primary bending loads, so that the skin material can be made of thicker, lighter material for improved impact resistance. For example, plastic based fiber can replace much of the glass in the laminate, while an intimately adhering layer of thermoplastic PC, ABS, etc. can substitute for the layer of gel coat, as is done in the U.S. Pat. No. 4,713,032 according to Frank, which is hereby incorporated by way of reference. Other useful lightweight reinforcing fibers are based on wood, in the form of paper for the interior of the sandwich or decorative veneer for the exterior.

Skin materials sufficiently thick to mask the movement of the mold parts and allow the production of custom shaped boards not mentioned above include liquid pre-foam applied directly to the surface of the shape defining mold 10 by brush, roller or spray, and the fiber-reinforced epoxy and polyurethane foams of the prior art (U.S. Pat. No. 4,713,032 to Frank). Other core materials manufactured for use in sandwich construction exhibit strength levels several times that of plastic foam at comparable densities but are not thermoplastic. These alternate cores may be trimmed and combined with the thermoformed, monocoque foam rail of the present invention to produce a board with even higher strength and lighter weight, although with an attendant increase in the mold-cycle and overall manufacturing costs. Examples of alternative core materials include end-grain balsa, and a host of honeycomb materials such as Nomex®, available from Hexcel Corp, and the foam filled honeycomb materials available from Westwind Composites in Houston, Tex. Sheets of thermoplastic foam useful for the present invention include PVC Divinycell® and Ester Core® cores available from Diab Group based in De Soto, Tex.; useful densities may yield compressive strengths between 120 and 360 psi; the thickness in the core, generally ranges between 0.16–0.25 inches. Differing skin core materials, thicknesses, and densities may be combined as will be appreciated by those of skill in the art.

The above core materials, as well as the other thermoplastic cores not specifically mentioned, will readily conform to the shape of the board in top and bottom halves. As will be immediately apparent to those of skill in the art, the present invention provides many methods to reduce the mold cycle. It will also be almost immediately apparent that in many methods the laminating step can be designed or is already suited to removing the board from the mold while the resin is still wet, thereby reducing the basic mold-cycle to the time required to pre-mold the skin core 27 and then apply the laminate, generally under ten minutes per side in each operation. The rapid mold-cycle will then facilitate the effective use of the fabric impregnator 80 described above, thereby making major savings in labor possible, as well as increased board strength. Obviously, the strength of the board will also be increased by continuing the sandwich structure around the perimeter of the board to create an essentially monocoque perimeter rail. The sandwich structure in each half may meet and be abuttingly joined, or an inward turning sandwich flange may be created in the same manner as the solid laminate flange commonly used in the prior art.

The pressure needed to cause the thermoplastic material being molded to conform to the shape of the mold can be supplied by a variety of other means, such as a two part mold press, fluid or gas filled bladders or similar devices, while heat can be supplied by conventional electrical heating elements, heat blankets, recirculating high-heat transfer fluids, or the variety of other methods known in the art.

Although the term "structural sandwich" has been used in conjunction with a skin core with strength facing material on both sides, a person of skill in the art will appreciate that the structural sandwich is not limited to that embodiment and also includes the use of skin cores wherein the strength facing material is provided on one side only or is selectively omitted. For example, the interior facing may be deleted altogether without departing from the scope of the invention.

In addition, the molded skin core 27 of the board develops very high strength when high-strength facing material is applied to both the interior and exterior surfaces. Persons with knowledge of the art will realize that the sandwich structure can be selectively omitted in certain areas without significantly compromising the board's strength, or completely omitted in order to save weight or cost of material in manufacture.

All of the above is intended be within the gist of the present invention, and it will be appreciated that the scope of the invention is not limited to the embodiments described above. Various modifications and alterations might be made by those skilled in the art without departing from the spirit and scope of the present invention.

I claim:

1. A board comprising:
    molded right and left halves bonded together along a longitudinal axis of symmetry, each of the right and left halves having an exterior structural skin covering forming an interior, the exterior structural skin of each of the right and left halves further characterized by having,
    a skin core formed of a layer of core material, with high-strength facing material covering a surface of the skin core, the skin core forming a perimeter rail characterized by being seamless except where said right and left halves are bonded together.

2. The board of claim 1 wherein the skin core forms a monocoque rail.

3. The board of claim 1, wherein the right and left halves are bonded to a central spar having an I-beam configuration.

4. The board of claim 1, wherein the right and left halves are bonded to a central spar having a box-beam configuration.

5. The board of claim 1, wherein the right and left halves are bonded to a reinforcing structure.

6. The board of claim 1, wherein the interior is an interior chamber and further wherein the interior chamber is filled with a material selected from the group consisting of: low-density foam, chambered foam, and expanded foam beads.

7. A mold system for fabricating a board such as those used for water sports, comprising:
    a mold half adapted to form a left or right half of the board, the mold half being characterized by a functional convex exterior surface about which a hollow skin core may be shaped, the mold half including a plurality of subparts which may be independently adjusted to affect the shaping of said hollow skin core.

8. The mold system of claim 7 wherein
    said subparts correspond to particular aspects of a finished board and are selected from the group consisting of bottom rocker, deck, perimeter rail, nose and tail.

9. The mold system of claim 7 wherein
    the mold half if adapted to be mounted perpendicularly upon a horizontal work surface so as to occupy a minimum amount of work surface.

10. The mold system of claim 7 wherein the mold half is hollow and adjustable so as to be reversible such that it may utilized as a female mold to form complex curvature shapes.

* * * * *